United States Patent
Kuraishi

(10) Patent No.: US 7,669,867 B2
(45) Date of Patent: Mar. 2, 2010

(54) SHACKLE STRUCTURE FOR SUSPENSION LEAF SPRING

(75) Inventor: Masakazu Kuraishi, Kanagawa-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 176 days.

(21) Appl. No.: 11/798,404

(22) Filed: May 14, 2007

(65) Prior Publication Data

US 2007/0262553 A1 Nov. 15, 2007

(30) Foreign Application Priority Data

May 15, 2006 (JP) .............................. 2006-134635
Apr. 19, 2007 (JP) .............................. 2007-110398

(51) Int. Cl.
*B60G 11/10* (2006.01)
*B60G 11/12* (2006.01)
(52) U.S. Cl. ..................... 280/124.175; 280/124.131; 267/269; 267/271
(58) Field of Classification Search .......... 280/124.175, 280/124.163, 124.17, 124.13, 124.131; 267/269; 267/271, 260
See application file for complete search history.

(56) References Cited

U.S. PATENT DOCUMENTS

| 1,827,234 | A | | 10/1931 | Hughes |
| 3,511,493 | A | | 5/1970 | Burrell |
| 3,596,923 | A | | 8/1971 | Nakamura et al. |
| 5,354,092 | A | * | 10/1994 | Calvert ................ 280/124.102 |
| 7,204,500 | B2 | * | 4/2007 | Hunt .................... 280/124.175 |

FOREIGN PATENT DOCUMENTS

| DE | 32 40981 A1 | 5/1984 |
| GB | 824 032 A | 11/1959 |
| GB | 1 370 970 A | 10/1974 |
| JP | 59-063005 U | 4/1984 |
| JP | 62-037207 A | 2/1987 |
| JP | 04-345510 | 12/1992 |
| JP | 08-268023 A | 10/1996 |
| JP | 2000-249180 A | 9/2000 |

* cited by examiner

*Primary Examiner*—Paul N Dickson
*Assistant Examiner*—Drew Brown
(74) *Attorney, Agent, or Firm*—Foley & Lardner LLP

(57) ABSTRACT

A pair of left and right shackles operative to support the vehicle-rear-side end portions of a pair of left and right suspension leaf springs. The left and right shackles have structures whereby the rigidity center positions of the leaf-spring-side bushings are offset to further outside areas of the vehicle than the rigidity center positions of the vehicle-body-side bushings, respectively.

8 Claims, 12 Drawing Sheets

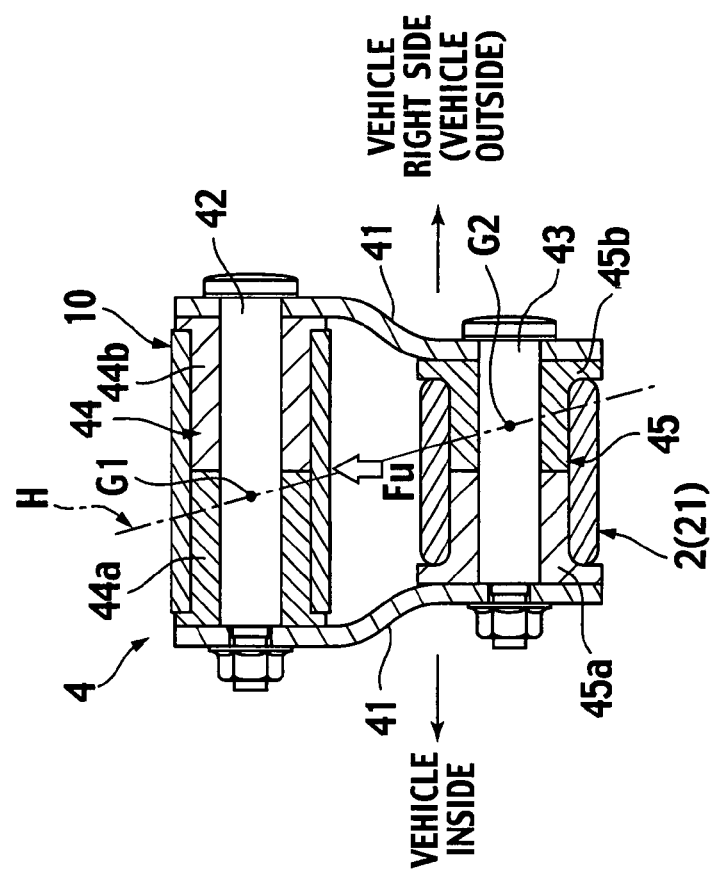
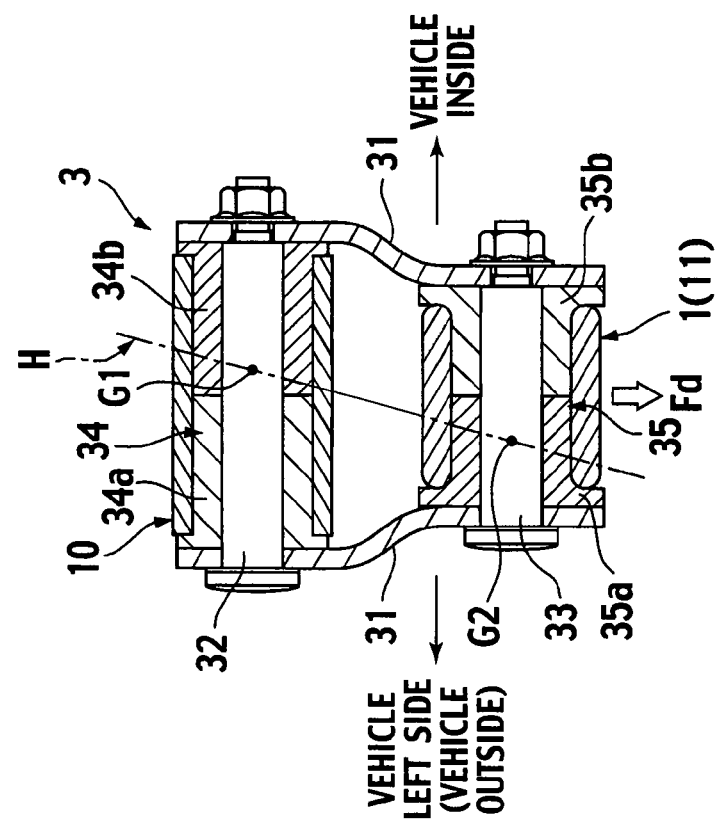

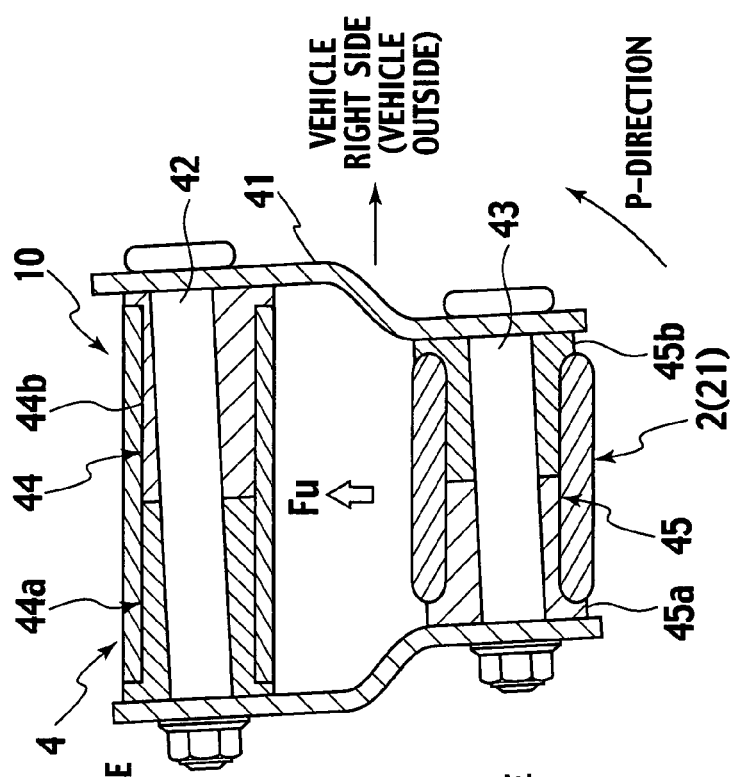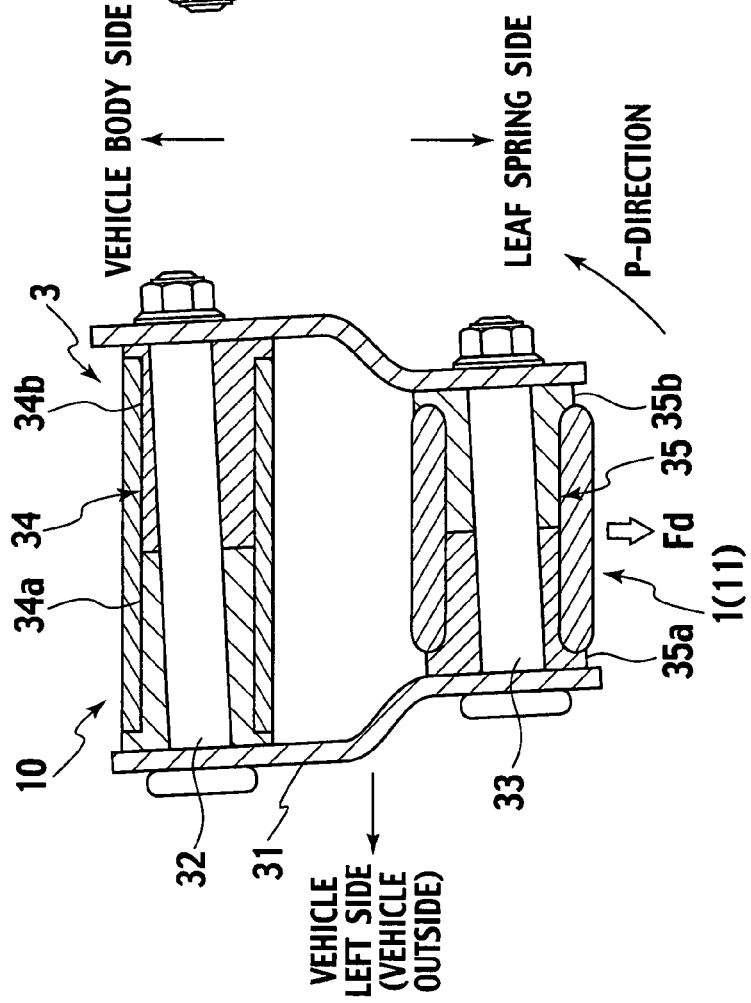

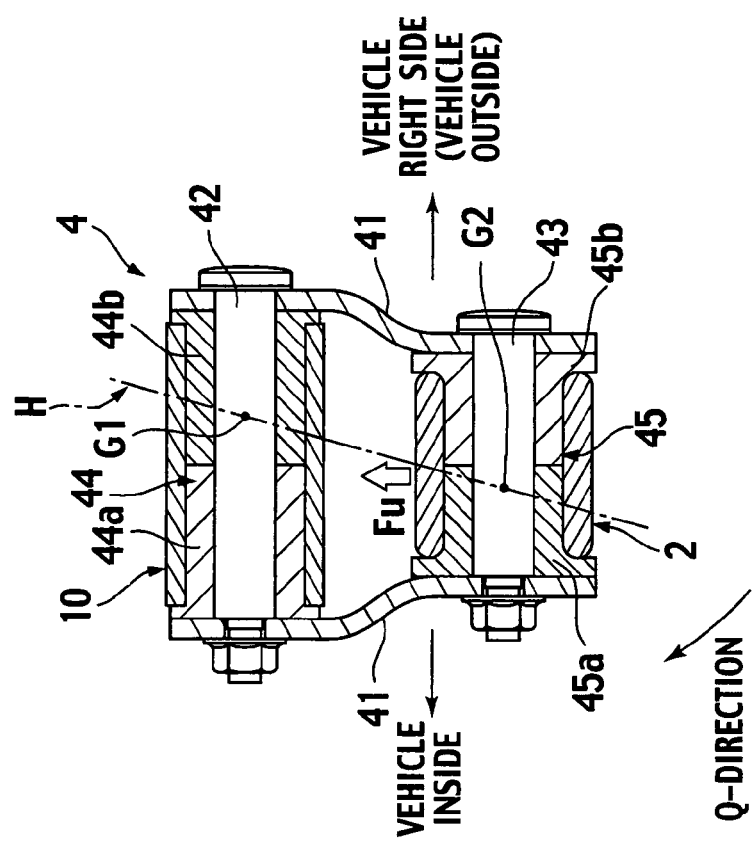
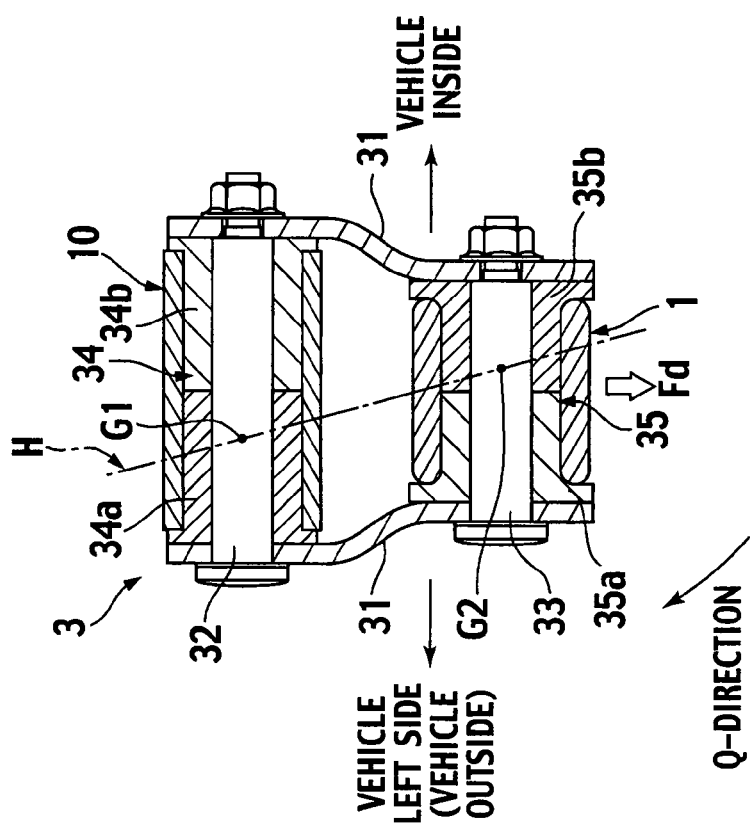

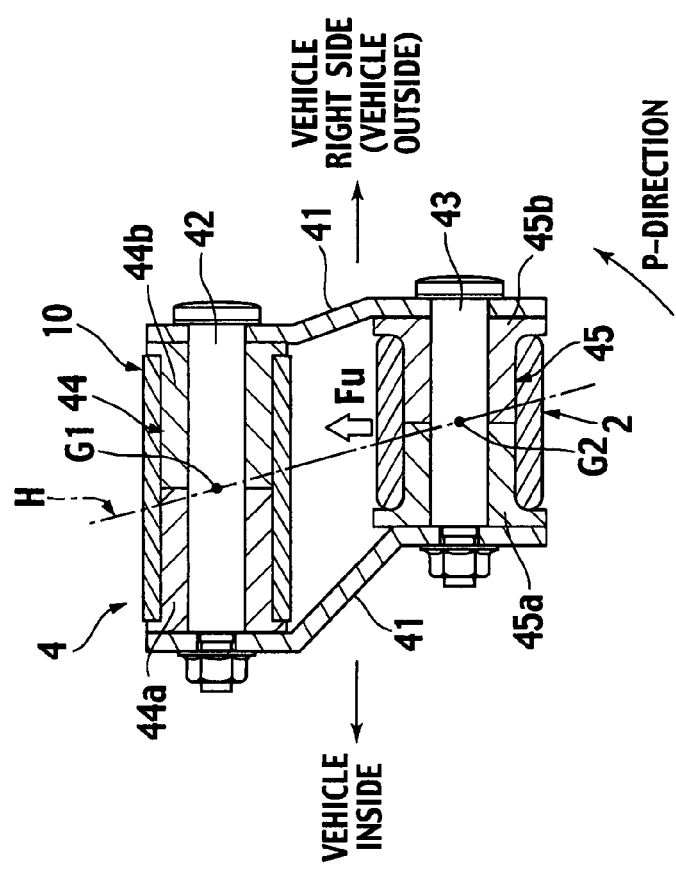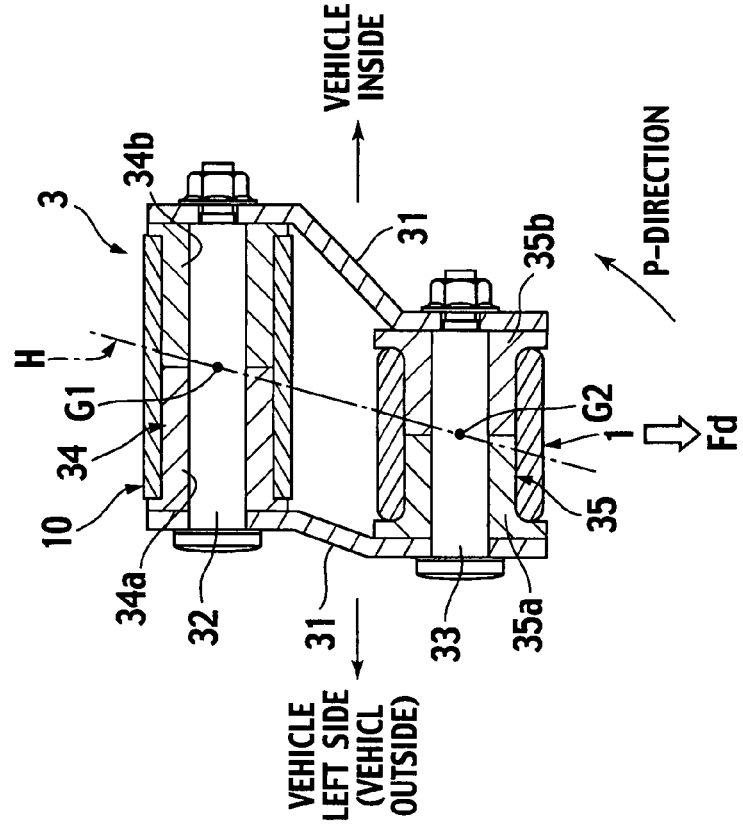

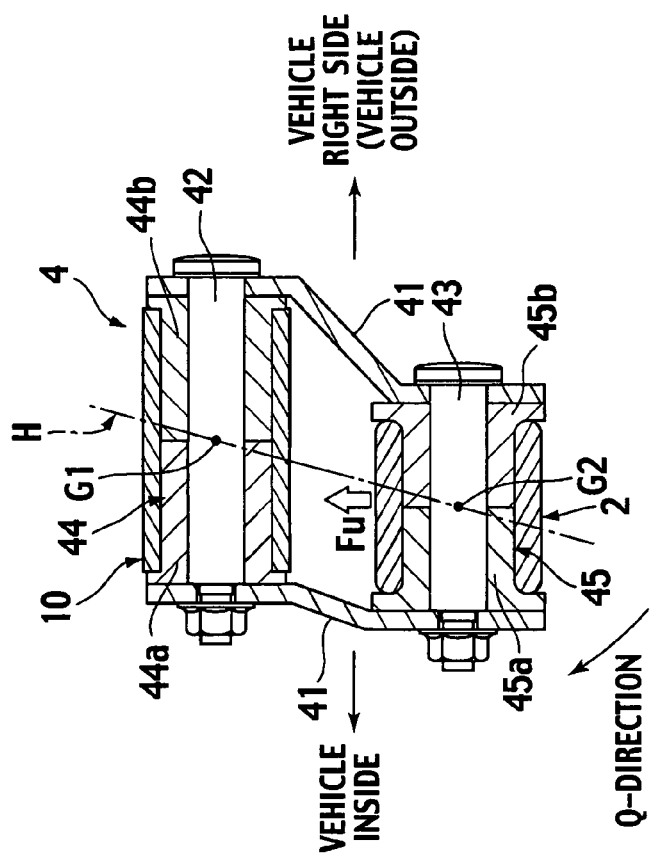
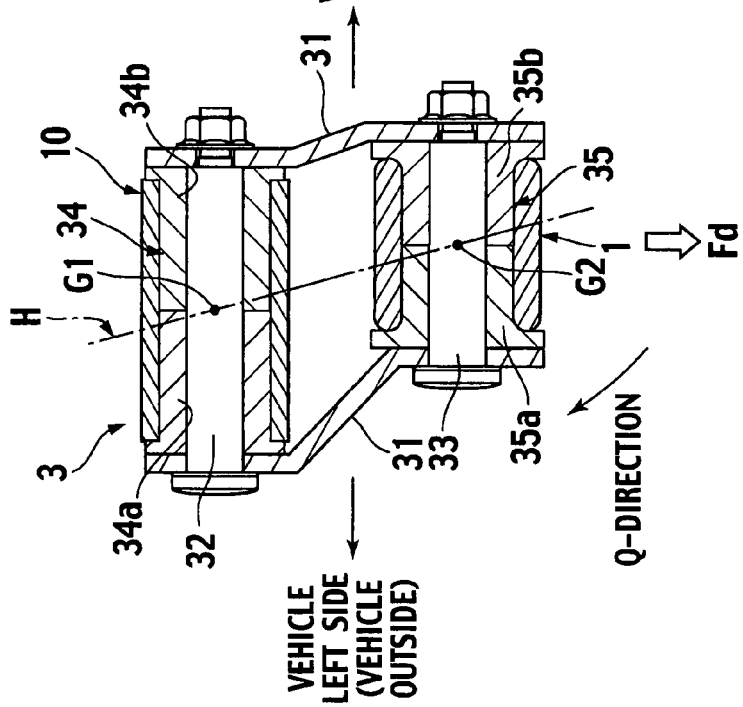

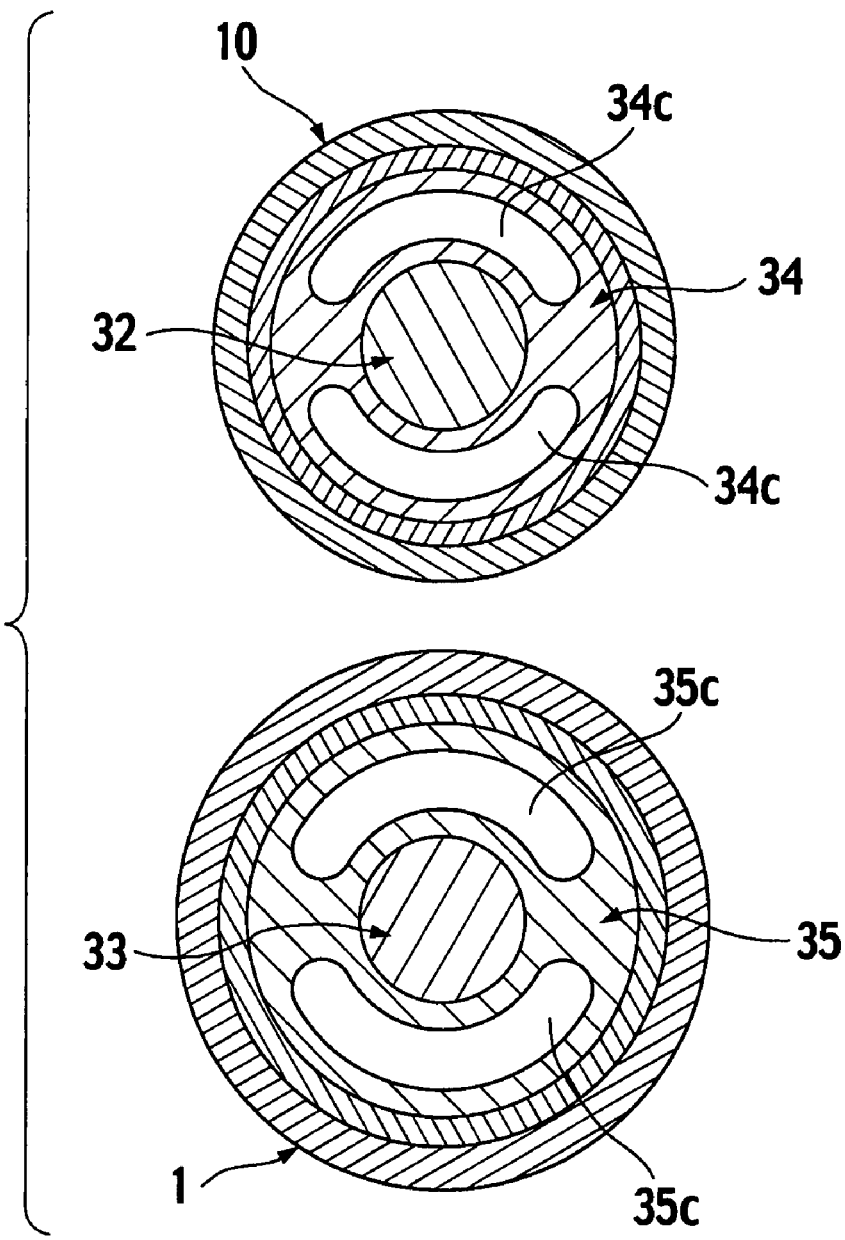

SHACKLE STRUCTURE FOR SUSPENSION LEAF SPRING

BACKGROUND OF THE INVENTION

1. Field of the Invention

The present invention relates to a shackle structure for suspension leaf springs.

2. Description of the Related Art

Examples of shackles for suspension leaf springs, employed in the related art, are classified into structures such as, for instance, those described below.

That is, a structure may include pairs of left and right shackle plates, vehicle-body-side bushing support shafts (also hereinafter called "vehicle-body-side bush support shafts") through each of which the upper portions of the shackle plates are connected to each other, leaf-spring-side bushing support shafts (also hereinafter called "leaf-spring-side bush support shafts") through each of which the lower portions of the shackle plates are connected to each other, vehicle-body-side bushings (also hereinafter called "bushes") fitted to the vehicle-body-side bush support shafts, respectively, and leaf-spring-side bushes (or bushings) fitted to the leaf-spring-side bush support shafts, respectively. A structure has heretofore been known in which the vehicle-body-side bush (or bushing) and the leaf-spring-side bush (or bushing) are split left and right in two halves, respectively (see, for instance, Utility Model Laid-Open No. 59-063005).

With such a related art structure, the vehicle-body-side bush and the leaf-spring-side bush are placed under a bilaterally symmetric state such that rigidity center positions of the vehicle-body-side bush and the leaf-spring-side bush are aligned in a vehicle widthwise direction.

With the shackles of the related art, however, the vehicle-body-side bushes and the leaf-spring-side bushes have rigidity center positions defined in the bilaterally symmetric state to be aligned in the vehicle widthwise direction. Therefore, during a turning motion of a vehicle, no change occurs in a toe angle of the wheels. This results in a difficulty of increasing driveability of the vehicle with an under-steer characteristic during a turning and traveling motion of the vehicle.

SUMMARY OF THE INVENTION

It is, therefore, an object of the present invention to provide a shackle structure for suspension leaf springs capable of increasing driveability of a vehicle during a turning and traveling motion thereof.

To achieve the above object, the invention described herein relates to a shackle structure for supporting the vehicle-rear-side end portions of a pair of left and right suspension leaf springs on a vehicle body via shackles, respectively, which comprises the shackles including vehicle-body-side bushes (or bushings), supported on the vehicle body, and leaf-spring-side bushes (or bushings) supported on the leaf springs, wherein the vehicle-body-side bushes have rigidity center positions offset to further inside areas of a vehicle than rigidity center positions of the leaf-spring-side bushes.

The invention described herein also relates to a shackle structure for supporting the vehicle-front-side end portions of a pair of left and right suspension leaf springs on a vehicle body via shackles, respectively, which comprises the shackles including vehicle-body-side bushes (or bushings), supported on the vehicle body, and leaf-spring-side bushes (or bushings) supported on the leaf springs, wherein the vehicle-body-side bushes have rigidity center positions offset to further outside areas of a vehicle than rigidity center positions of the leaf-spring-side bushes.

With the shackle structure for suspension leaf springs described herein, as set forth above, the rigidity center positions of the vehicle-body-side bushes (or bushings) are offset to the further inside areas of the vehicle than the rigidity center positions of the leaf-spring-side bushes (or bushings). That is, the rigidity center axes are placed under inclined states in a reverse "V-shape" configuration as viewed from a vehicle front area toward a vehicle rear area. Therefore, even if the vehicle is steered in either a left or right direction, a rotational moment occurs on a turning-outer-wheel-side shackle acting as a bound side. This causes an input load, directed upward, to twist the leaf-spring-side bush support shaft to the vehicle outside relative to the vehicle-body-side bush support shaft. As a result, the turning-outer-wheel-side shackle bears a motion in which the leaf-spring-side component deviates toward the vehicle outside.

Meanwhile, a rotational momentum occurs on a turning-inner-wheel-side shackle acting as a rebound side. This causes an input load, directed downward, to twist the leaf-spring-side bush support shaft relative to the vehicle-body-side bush support shaft. Accordingly, the turning-inner-wheel-side shackle bears a motion in which the leaf-spring-side component deviates toward the facing the vehicle inside. Therefore, a vehicle axle rotates in a turning direction with a center on the vehicle-body-side front end of the leaf spring, causing both drive wheels to have a toe angle varying under an under-steer condition.

Accordingly, the drive wheels can be automatically changed to the under-steer state during the turning motion of the vehicle, thereby providing increased driveability of the vehicle during the turning and traveling motion thereof.

With the shackle structure for suspension leaf springs described herein, the vehicle-body-side bushes (or bushings) have the rigidity center positions offset to further outside areas of the vehicle than the rigidity center positions of the leaf-spring-side bushes (or bushings). This causes the rigidity center axes to be placed under inclined states in a "V-shape" configuration.

Therefore, even if the vehicle is steered in either left or right directions, the rotational momentum occurs on the turning-outer-wheel-side shackle acting as the bound side. This causes the input load, directed upward, to twist the leaf-spring-side bush support shaft to the facing the vehicle inside relative to the vehicle-body-side support shaft. At the same time, further, the rotational momentum occurs on the turning-inner-wheel-side shackle acting as the rebound side. This causes the input load, directed downward, to twist the leaf-spring-side bush support shaft to the facing a vehicle outside relative to the vehicle-body-side support shaft. Accordingly, the turning-inner-wheel-side shackle bears the motion in which the leaf-spring-side component deviates toward the facing a vehicle outside. Accordingly, the vehicle axle rotates in the turning direction with the center on the vehicle-body-side front end of the leaf spring, causing both the drive wheels to have the toe angle varying under the under-steer state.

Accordingly, the drive wheels can be automatically changed to the under-steer condition during the turning motion of the vehicle, thereby providing increased driveability of the vehicle during the turning and traveling motion thereof.

BRIEF DESCRIPTION OF THE DRAWINGS

FIGS. 2A and 2B are enlarged cross sectional views of shackles for suspension leaf springs of the first embodiment as viewed from a vehicle rear side toward a vehicle front side, with FIG. 2A showing a vehicle-left-side shackle and FIG. 2B showing a vehicle-right-side shackle.

FIGS. 3A and 3B are enlarged cross sectional views showing states under which the shackles are deformed when a load is applied to the shackles shown in FIGS. 2A and 2B and FIG. 2A shows a vehicle-left-side shackle while FIG. 2B shows a vehicle-right-side shackle.

FIGS. 5A and 5B are enlarged cross sectional views showing shackles for suspension leaf springs of a second embodiment as viewed from the vehicle rear side toward the vehicle front side, with FIG. 5A showing a vehicle-left-side shackle and FIG. 5B showing a vehicle-right-side shackle.

FIGS. 9A and 9B are enlarged cross sectional views showing shackles for suspension leaf springs of a fifth embodiment, with FIG. 9A showing a vehicle-left-side shackle and FIG. 9B showing a vehicle-right-side shackle.

FIGS. 10A and 10B are enlarged cross sectional views showing shackles for suspension leaf springs of a sixth embodiment, with FIG. 10A showing a vehicle-left-side shackle and FIG. 10B showing a vehicle-right-side shackle.

FIG. 12 is a cross sectional view taken on line A-A of FIG. 11A.

DETAILED DESCRIPTION OF THE EMBODIMENTS

Now, various embodiments of the present invention will be described below with reference to the accompanying drawings.

First Embodiment

A shackle structure for suspension leaf springs of a first embodiment is shown in FIGS. 1 to 4.

Figure 1:
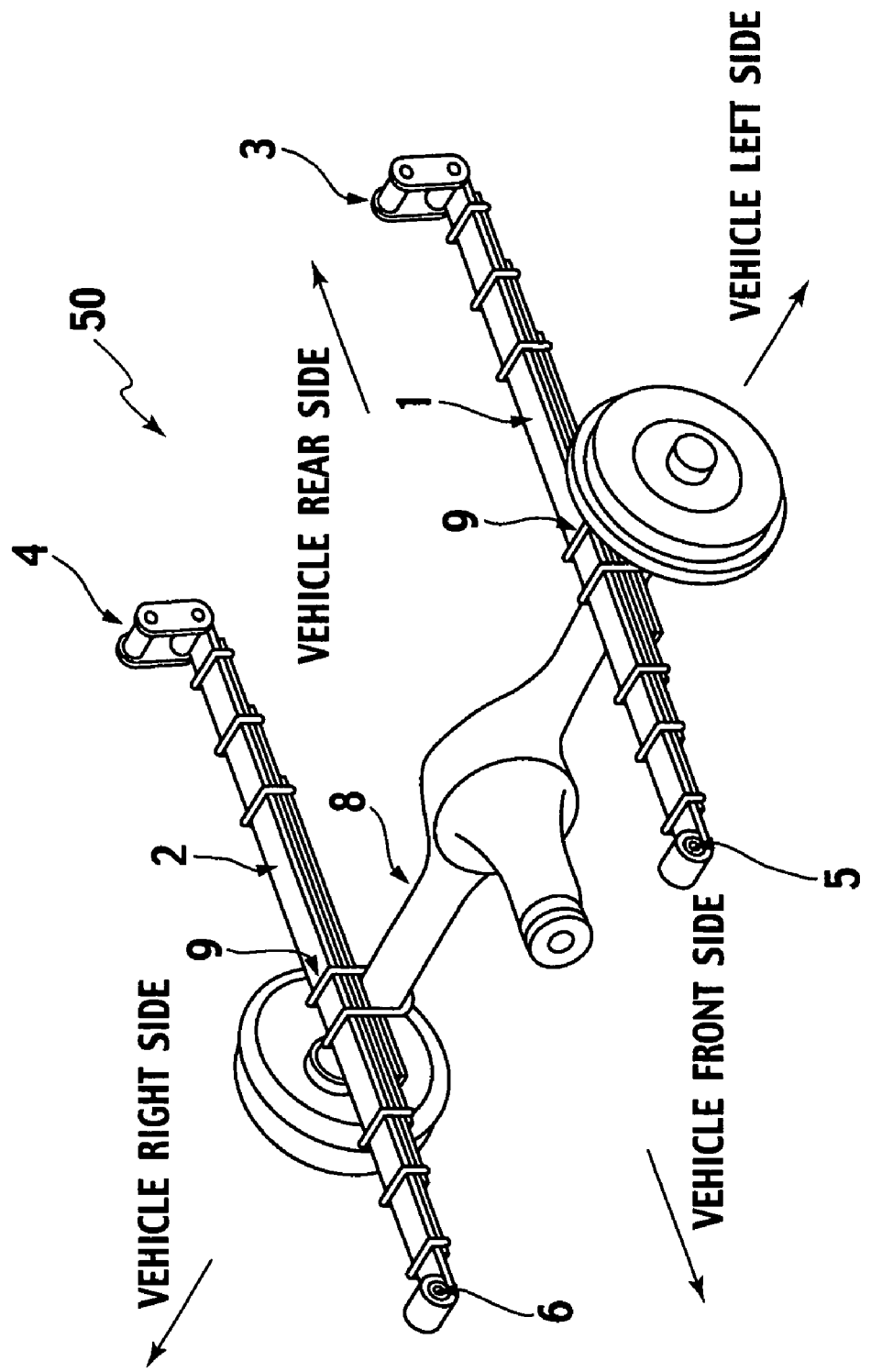
FIG. 1 is a perspective view showing a vehicle suspension device to which a shackle structure for suspension leaf springs of a first embodiment according to the present invention is applied.

FIG. 1 is a perspective view showing a vehicular suspension device to which the shackle structure for the suspension leaf springs of the first embodiment is applied. FIGS. 2A and 2B are enlarged cross sectional views showing the shackle structure for the suspension leaf springs of the first embodiment as viewed at a vehicle rear area in a direction toward a vehicle front area. FIGS. 3A and 3B are enlarged cross sectional views showing the shackles appearing in deformed states when a load is applied to the shackles shown in FIGS. 2A and 2B.

As shown in FIG. 1, a vehicle suspension device 50, to which the shackle structure for the suspension leaf springs of the first embodiment is applied, includes left and right leaf springs 1, 2, which have vehicle-rear-side end portions mounted on a vehicle body via the shackles 3, 4 and vehicle-front-side end portions mounted on the vehicle body via antivibrating bodies 5, 6.

Further, an axle case 8 has both ends fixedly supported on the left and right leaf springs 1, 2 at substantially central areas thereof via U-bolts 9 and rotatably accommodates therein an axle shaft.

As shown in FIGS. 2A and 2B, the shackles 3, 4 include left and right pairs of shackle plates 31, 41, vehicle-body-side bush support shafts 32, 42 through which upper portions of the shackle plates 31, 41 are connected to each other, leaf-spring-side bush support shafts 33, 43 through which lower portions of the shackle plates 31, 41 are connected to each other, vehicle-body-side bushes 34, 44 fitted to the vehicle-body-side bush support shafts 32, 42, respectively, and leaf-spring-side bushes 35, 45 fitted to the leaf-spring-side bush support shafts 33, 43, respectively.

In addition, the vehicle-body-side bushes 34, 44 and the leaf-spring-side bushes 35, 45 are split into left and right two halves, respectively.

The vehicle-body-side bush (or bushing) 34 of the shackle 3, placed on a left side of the vehicle, includes split bushes (or bushings) 34a, 34b which are split into two halves at a center in a transverse direction. Of these, the split bush (or bushing) 34b facing a vehicle inside is set to have a higher rigidity (that is, high elastic coefficient) than that of the split bush (or bushing) 34a facing a vehicle outside. In addition, the leaf-spring-side bush (or bushing) 35 of the shackle 3, placed on the left side of the vehicle, includes split bushes (or bushings) 35a, 35b which are split into two halves at a center in the transverse direction. Of these, the split bush (or bushing) 35a, facing the vehicle outside, is set to have a higher rigidity (that is, high elastic coefficient) than that of the split bush (or bushing) 35b facing the vehicle inside.

Further, the vehicle-body-side bush 44 of the shackle 4, placed on a right side of the vehicle, includes split bushes 44a, 44b which are split into two halves at a center in a transverse direction. Of these, the split bush 44a, facing the vehicle inside, is set to have higher rigidity (that is, high elastic coefficient) than that of the split bush 44b facing the vehicle outside. In addition, the leaf-spring-side bush 45 of the shackle 4, placed on the right side of the vehicle, includes split bushes 45a, 45b which are split into two halves at a center in a transverse direction. Of these, the split bush 45b, facing the vehicle outside, is set to have higher rigidity (that is, high elastic coefficient) than that of the split bush 45a facing the vehicle inside.

Here, suppose a rigidity center position of the vehicle-body-side bushes 34, 44 lies at G1 and a rigidity center position of the leaf-spring-side bushes 35, 45 lies at G2. Then, the rigidity center position G1 is offset to a further facing the vehicle inside than the rigidity center position G2, with rigidity center axes (on a linear line interconnecting the rigidity center positions G1 and G2) H, H remaining under inclined states in a reverse "V-shape" configuration as viewed from the rear area of the vehicle.

Next, a sequence for the shackle 3 (4) to be assembled will be simply described below.

The leaf spring 1 (2) has a rear end folded into a substantially cylindrical boss portion 11 (21).

First, the split bushes 34a, 34b (44a, 44b) of the vehicle-body-side bush 34 (44) are press fitted to a substantially cylindrical boss portion 10, provided on a vehicle-body-side bracket, from open ends on both sides thereof.

Then, the split bushes 35a, 35b (45a, 45b) of the leaf-spring-side bushes 35 (45) are press fitted to the boss portion 11 (21) of the leaf spring 1 (2) from opening ends on both sides thereof.

Thereafter, the shackle plate 31, to which the vehicle-body-side bush support shaft 32 (42) and the leaf-spring-side bush support shaft 33 (43) are welded, is placed on the boss portions 10, 11 at one sides thereof.

Then, the vehicle-body-side bush support shaft 32 (42) and the leaf-spring-side bush support shaft 33 (43) are inserted to the vehicle-body-side bush 34 (44) and the leaf-spring-side bush 35 (45), respectively.

In addition, the other shackle plate 31 is placed on the boss portions 10, 11 at the other sides thereof, after which nuts are screwed on and tightened to leading ends of the vehicle-body-side bush support shaft 32 (42) and the leaf-spring-side bush support shaft 33 (43). Thus, the shackle 3 (4) can be assembled.

Next, advantageous effects of the first embodiment will be described below.

With the shackle structure for the suspension leaf springs of the first embodiment, as set forth above, the rigidity center positions G2 of both the leaf-spring-side bushes 35, 45 are offset to further outside areas of the vehicle than the rigidity center positions G1 of the vehicle-body-side bushes 34, 44 such that the rigidity center axes (on the linear line interconnecting the rigidity center positions G1 and G2) H, H lie in the tilted state in the reverse "V-shape" configuration.

Here, description is made with reference to a case where a steering wheel is steered to turn the vehicle leftward.

(1) First, as the vehicle is steered leftward, a rightward centrifugal force acts on the vehicle body. Therefore, as shown in FIGS. 2A and 2B, a right side of the vehicle body bears a load Fu directed upward and a left side of the vehicle body bears a load Fd directed downward.

(2) As set forth above, the leaf-spring-side bushes 35, 45 are press fitted to the boss portions 11, 21 formed on the leaf springs 1, 2 at the rear ends thereof. Accordingly, as shown in FIG. 3B, with the leaf-spring-side bush 45 of the shackle 4 placed on the vehicle at the right side thereof which plays a role as a turning-outer-wheel-side on a bound side, the split bush 45a facing the vehicle inside and having low rigidity is caused to elastically deform in a greater extent than that in which the split bush 45b, facing the vehicle outside and having high rigidity is deformed.

(3) Further, the vehicle-body-side bush 44 is press fitted to the boss portion 10 of the vehicle-body-side bracket. Consequently, with the vehicle-body-side bush 44 of the shackle 4 placed on the vehicle at the right side thereof, the split bush 44b facing the vehicle outside and having low rigidity is caused to elastically deform in a greater extent than that in which the split bush 44a, facing the vehicle inside and having high rigidity is deformed.

(4) Accordingly, the rear end portion of the leaf spring 2 placed on the vehicle at the right side thereof swings rightward of the vehicle, that is, in a direction P, with respect to the vehicle body such that forces are balanced in a stabled condition.

(5) Meanwhile, as shown in FIG. 3A, with the leaf-spring-side bush 35 of the shackle 3 placed on the vehicle at the left side thereof which plays a role as a turning-inner-wheel-side on a rebound side, the split bush 35b facing the vehicle inside and having low rigidity is caused to elastically deform in a greater extent than that in which the split bush 35a, facing the vehicle outside and having high rigidity is deformed.

(6) Further, the vehicle-body-side bush 34 is press fitted to and mounted on the boss portion 10 of the vehicle-body-side bracket. Consequently, with the vehicle-body-side bush 34 of the shackle 3 placed on the vehicle at the left side thereof, the split bush 34a facing the vehicle outside and having low rigidity is caused to elastically deform in a greater extent than that in which the split bush 34b facing the vehicle inside and having high rigidity is deformed.

(7) Accordingly, the rear end portion of the leaf spring 1 placed on the vehicle at the left side thereof swings rightward of the vehicle with respect to the vehicle body, that is, in a direction P in FIG. 3A such that the forces are balanced in the stabled condition.

(8) With the first embodiment described above, as shown in FIG. 4, if the vehicle is steered in a left direction, most of the front end portions of the leaf springs 1, 2 move and only the rear end portions of the leaf springs 1,2 swing rightward of the vehicle. Then, rear tires are directed leftward of the vehicle together with the leaf springs 1, 2 as viewed from the above.

Figure 4:
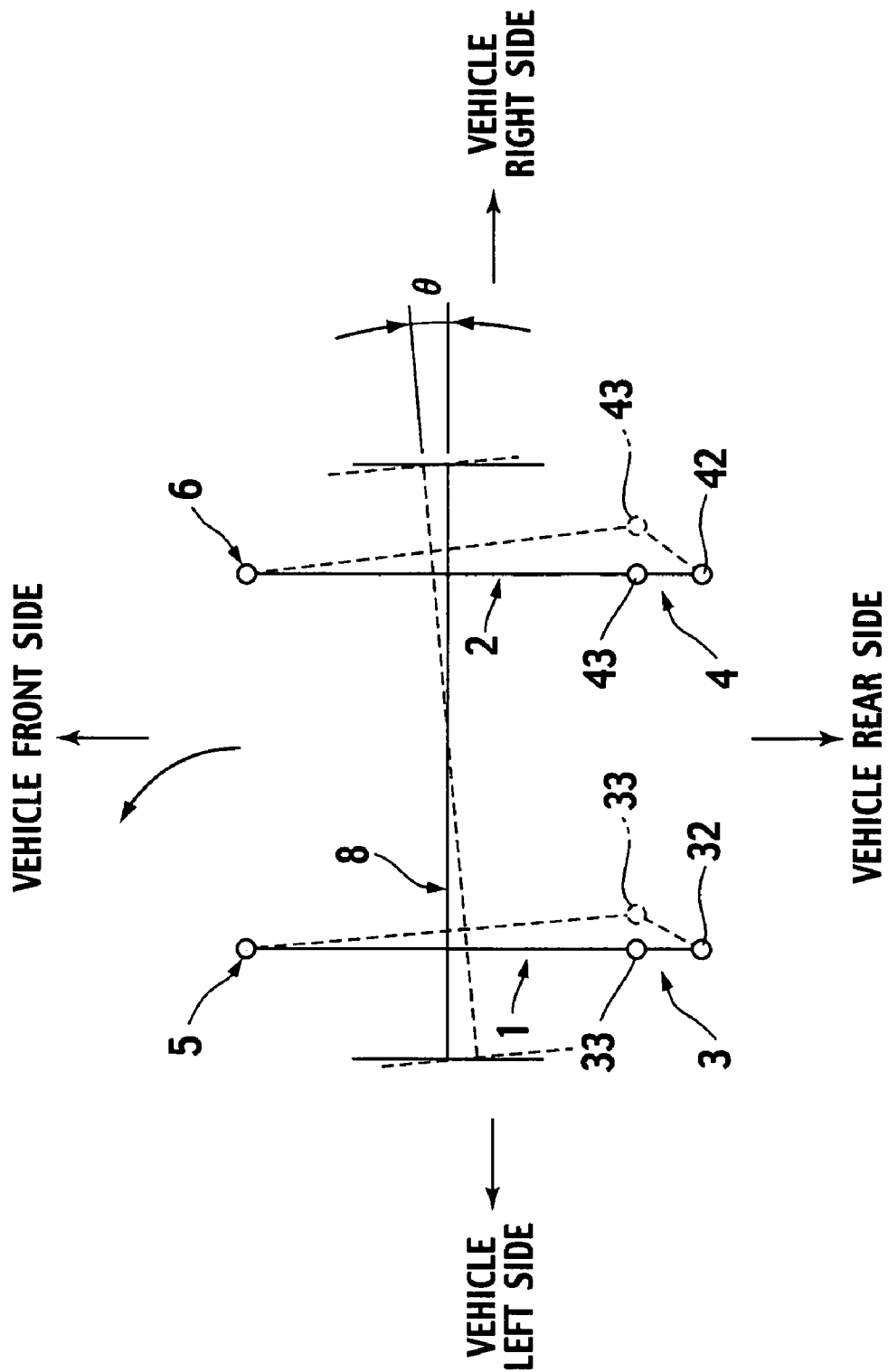
FIG. 4 is a schematic view illustrating an operation of the shackle structure for suspension leaf springs of the first embodiment.

With the above, when the vehicle is steered in a left direction, as shown in FIG. 4, front ends of the leaf springs 1, 2 do not move and only the rear end portions swing rightward of the vehicle. Then, the rear tires with the leaf springs 1, 2 are directed leftward of the vehicle together as viewed from the above.

Thus, when the vehicle is steered leftward, the axle case 8 is caused to rotate in a turning direction with centers on the antivibrating bodies 5, 6 placed on the leaf springs 1, 2 at the front area of the vehicle, thereby permitting the both drive wheels to have the toe angle θ varying in the under-steer condition.

Although not shown in the drawings, further, description is made with reference to another case where in contrast, the steering wheel is steered to turn the vehicle rightward.

(1) First, as the vehicle is steered rightward, a leftward centrifugal force acts on the vehicle body. Therefore, the left side of the vehicle body bears the load Fu directed upward and the right side of the vehicle body bears the load Fd directed downward.

(2) The leaf-spring-side bushes 35, 45 are press fitted to the boss portions 11, 21 formed on the leaf springs 1, 2 at the rear ends thereof. Accordingly, with the leaf-spring-side bush 35 of the shackle 3 placed on the vehicle at the left side thereof which plays a role as the turning-outer-wheel-side on the bound side, the split bush 35b facing the vehicle inside and having low rigidity is caused to elastically deform in a greater extent than that in which the split bush 35a, facing the vehicle outside and having high rigidity is deformed.

(3) Further, the vehicle-body-side bush 34 is press fitted to the boss portion 10. Consequently, with the vehicle-body-side bush 34 of the shackle 3 placed on the vehicle at the left side thereof, the split bush 34a facing the vehicle outside and having low rigidity is caused to elastically deform in a greater extent than that in which the split bush 34b facing the vehicle inside and having high rigidity is deformed.

(4) Accordingly, the rear end portion of the leaf spring 1 placed on the vehicle at the left side thereof swings leftward of the vehicle with respect to the vehicle body such that the forces are balanced in the stabled condition.

(5) Meanwhile, with the leaf-spring-side bush 45 of the shackle 4 placed on the vehicle at the right side thereof which plays a role as the turning-inner-wheel-side on the rebound side, the split bush 45a facing the vehicle inside and having low rigidity is caused to elastically deform in a greater extent than that in which the split bush 45b facing the vehicle outside and having high rigidity is deformed.

(6) Further, the vehicle-body-side bush 44 is press fitted to and mounted on the boss portion 10 of the vehicle-body-side bracket. Consequently, with the vehicle-body-side bush 44 of the shackle 4 placed on the vehicle at the right side thereof, the split bush 44b facing the vehicle outside and having low rigidity is caused to elastically deform in a greater extent than that in which the split bush 44a facing the vehicle inside and having high rigidity is deformed.

(7) Accordingly, the rear end portion of the leaf spring 2 placed on the vehicle at the right side thereof swings leftward of the vehicle with respect to the vehicle body such that the forces are balanced in the stabled condition.

(8) With the above, when the vehicle is steered in a right direction, front ends of the leaf springs 1, 2 do not move and only the rear end portions swing leftward of the vehicle. Then, the rear tires with the leaf springs 1, 2 are directed rightward of the vehicle together as viewed from the above.

Thus, when the vehicle is steered rightward, the axle case 8 is caused to rotate in a turning direction with centers on the antivibrating bodies 5, 6 placed on the leaf springs 1, 2 at the front area of the vehicle, thereby permitting the both drive wheels to have the toe angle θ varying in the under-steer condition.

With the present embodiment, therefore, the drive wheels can be automatically changed to the under-steer condition during the turning motion of the vehicle, thereby providing increased driveability of the vehicle during the turning and traveling motion thereof.

Further, not only both the split bushes 34a, 34b (44a, 44b) of the vehicle-body-side bush 34 (44), which is divided left and right in two halves, respectively, and both the split bushes 35a, 35b (45a, 45b) of the leaf-spring-side bush 35 (45), which is divided left and right in two halves, respectively, suffice to have different rigidities but also the rests of the other component parts suffice to employ the same component parts as those of the related art intact. This enables the suppression of a remarkable increase in cost.

Second Embodiment

Next, a second embodiment will be described. The same component parts as those of the first embodiment are omitted from the drawings and bear like reference numerals to omit redundant description. The second embodiment will be described below with a focus on points differing from those of the first embodiment.

Figure 6:
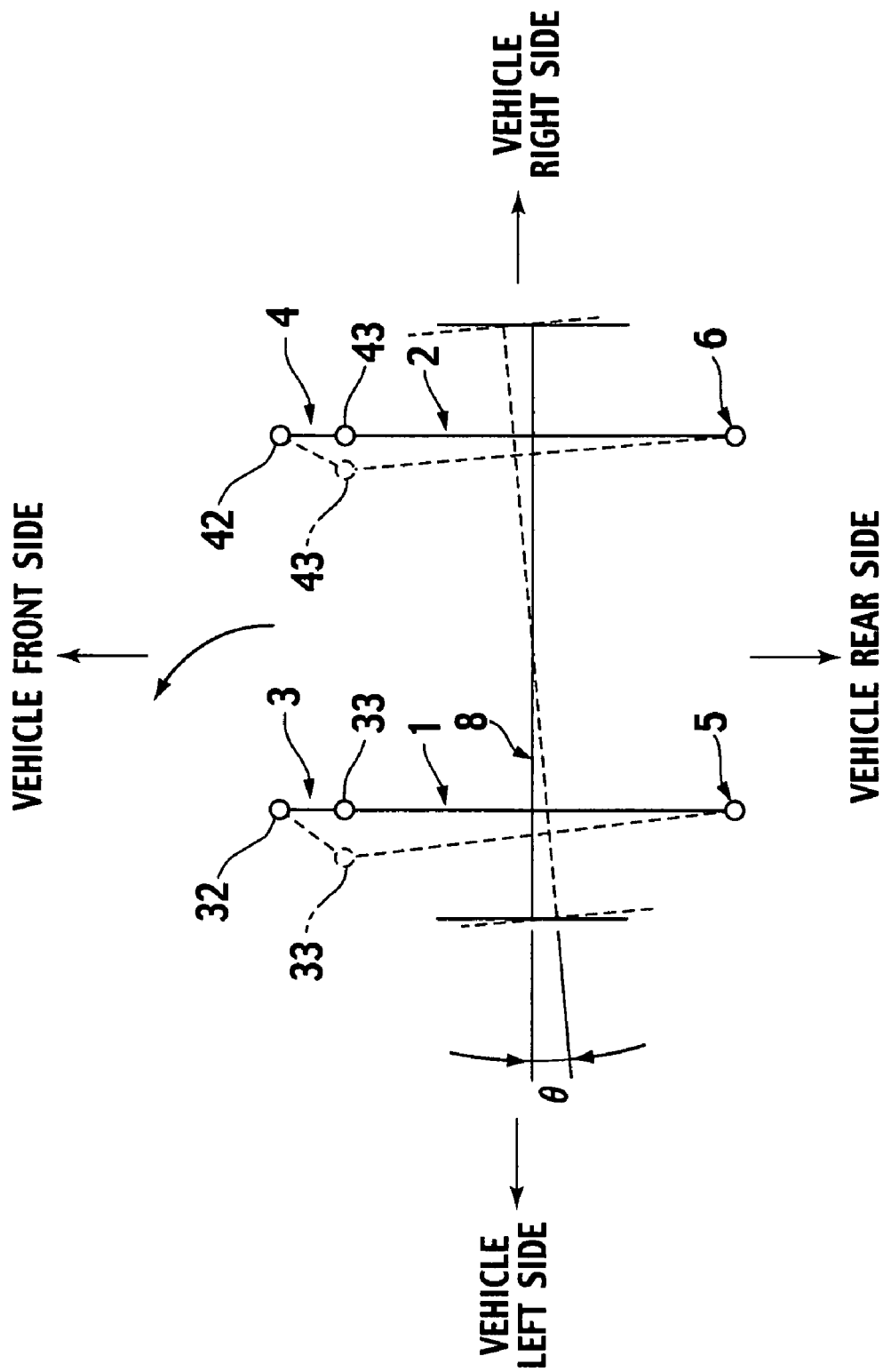
FIG. 6 is a schematic view illustrating an operation of the shackle structure for suspension leaf springs of the second embodiment.

A suspension leaf spring shackle structure of the second embodiment is shown in FIGS. 5A, 5B, and 6.

FIGS. 5A and 5B are enlarged cross sectional views showing essential parts of a suspension leaf spring shackle structure of a second embodiment. FIG. 6 is a view illustrating the operation of the suspension leaf spring shackle structure of the second embodiment.

With a vehicle suspension device to which the suspension leaf spring shackle structure of the second embodiment is applied, left and right front ends of the left and right leaf springs 1,2 are mounted on the vehicle body via the shackles 3, 4 as shown in FIG. 6. In addition, left and right rear ends of the left and right leaf springs 1,2 are mounted on the vehicle body via the antivibrating bodies 5, 6.

Therefore, as shown in FIGS. 5A and 5B, the second embodiment is set such that in contrast to the structure of the first embodiment, of the both split bushes 34a, 34b of the vehicle-body-side bush 34 of the shackle 3 placed on the vehicle body at the left side thereof and divided left and right in two halves, respectively, the split bush 34a facing the vehicle outside has higher rigidity than that of the split bush 34b facing the vehicle inside. In addition, of the both split bushes 35a, 35b of the leaf-spring-side bush 35 divided left and right in two halves, respectively, the split bush 35b facing the vehicle inside has higher rigidity than that of the split bush 35a, facing the vehicle outside.

Further, of both the split bushes 44a, 44b of the vehicle-body-side bush 44 placed on the shackle 4 on the right side of the vehicle body and divided left and right in two halves, respectively, the split bush 44b facing the vehicle outside has higher rigidity than that of the split bush 44a, facing the vehicle inside. In addition, of the both split bushes 45a, 45b of the leaf-spring-side bush 45 placed on the shackle 4 on the right side of the vehicle body and divided left and right in two halves, respectively, the split bush 45a facing the vehicle inside has higher rigidity than that of the split bush 45b facing the vehicle outside.

Accordingly, the rigidity center positions G2 of both the leaf-spring-side bushes 35, 45 are offset to further inside areas of the vehicle than the rigidity center positions G1 of both the vehicle-body-side bushes 34, 44, respectively, such that the rigidity center axes (on the linear line interconnecting the rigidity center positions G1 and G2) H, H lie in the inclined states in a "V-shape" configuration.

Next, advantageous effects of the second embodiment will be described below.

With the shackle structure for the suspension leaf springs of the second embodiment, as set forth above, the rigidity center positions G2 of both the leaf-spring-side bushes 35, 45 are offset to further inside areas of the vehicle than those of the rigidity center positions G1 of both the vehicle-body-side bushes 34, 44 such that the rigidity center axes (on the linear line interconnecting the rigidity center positions G1 and G2) H, H lie in the tilted state in the "V-shape" configuration.

Here, description is made with reference to a case where the steering wheel is steered to turn the vehicle leftward.

(1) First, as the vehicle is steered leftward, a rightward centrifugal force acts on the vehicle body. Therefore, as shown in FIGS. 5A and 5B, the right side of the vehicle body bears the load Fu directed upward and the left side of the vehicle body bears the load Fd directed downward.

(2) As set forth above, the leaf-spring-side bushes 35, 45 are press fitted to the boss portions formed on the front ends of the leaf springs 1, 2. Accordingly, with the leaf-spring-side bush 45 of the shackle 4 placed on the vehicle at the right side thereof and acting as a turning-outer-wheel-side to play a role as a bound side, the split bush 45b, facing the vehicle outside and having low rigidity is caused to elastically deform in a greater extent than that in which the split bush 45a facing the vehicle inside and having high rigidity is deformed.

(3) Further, the vehicle-body-side bush 44 is press fitted to the boss portion 10 of the vehicle-body-side bracket. Consequently, with the vehicle-body-side bush 44 of the shackle 4 placed on the vehicle at the right side thereof, the split bush 44a facing the vehicle inside and having low rigidity is caused to elastically deform in a greater extent than that in which the split bush 44b facing the vehicle outside and having high rigidity is deformed.

(4) Accordingly, the front end portion of the leaf spring 2 placed on the vehicle at the right side thereof swings leftward of the vehicle with respect to the vehicle body, that is, in the direction Q shown in FIG. 5B such that the forces are balanced in the stabled condition.

(5) Meanwhile, with the leaf-spring-side bush 35 of the shackle 3 placed on the vehicle at the left side thereof and acting as a turning-inner-wheel-side to play a role as a rebound side, the split bush 35a facing the vehicle outside and having low rigidity is caused to elastically deform in a greater extent than that in which the split bush 35b facing the vehicle inside and having high rigidity is deformed.

(6) Further, the vehicle-body-side bush 34 is press fitted to the boss portion 10 of the vehicle-body-side bracket. Therefore, with the vehicle-body-side bush 34 of the shackle 3 placed on the vehicle at the left side thereof, the split bush 34b facing the vehicle inside and having low rigidity is caused to elastically deform in a greater extent than that in which the split bush 34a facing the vehicle outside and having high rigidity is deformed.

(7) Accordingly, the front end portion of the leaf spring 1 placed on the vehicle at the left side thereof swings leftward of the vehicle with respect to the vehicle body, that is, in the direction Q shown in FIG. 5A such that the forces are balanced in the stabled condition.

(8) With the second embodiment described above, when the vehicle is steered in a left direction as shown in FIG. 6, none of the rear end portions of the leaf springs 1, 2 move and only the front end portions of the leaf springs 1,2 swing leftward of the vehicle, that is, in directions Q shown in FIGS. 5A and 5B. Then, the rear tires and the leaf springs 1, 2 are directed leftward of the vehicle as viewed from the above.

Thus, when the vehicle is steered leftward, the axle case 8 is caused to rotate in a turning direction about centers of the antivibrating bodies 5, 6 placed on the leaf springs 1, 2 on the rear ends thereof. This allows both the drive wheels to have the toe angle θ varying in the under-steer condition.

Although not shown in the drawings, description is made with reference to another case where in contrast to the structure mentioned above, the vehicle is steered rightward.

(1) First, as the vehicle is steered rightward, a leftward centrifugal force acts on the vehicle body. Therefore, the left side of the vehicle body bears the load Fu directed upward and the right side of the vehicle body bears the load Fd directed downward.

(2) The leaf-spring-side bushes 35, 45 are press fitted to the boss portions formed on the front ends of the leaf springs 1, 2. Accordingly, with the leaf-spring-side bush 35 of the shackle 3 placed on the vehicle at the left side thereof and acting as the turning outer-wheel-side playing a role as the bound side, the split bush 35a, facing the vehicle outside and having low rigidity, is caused to elastically deform in a greater extent than that in which the split bush 35b, facing the vehicle inside and having high rigidity, is deformed.

(3) Further, the vehicle-body-side bush 34 is press fitted to the boss portion 10. Consequently, with the vehicle-body-side bush 34 of the shackle 3 placed on the left side of the vehicle, the split bush 34b, facing the vehicle inside and having low rigidity, is caused to elastically deform in a greater extent than that in which the split bush 34a, facing the vehicle outside and having high rigidity, is deformed.

(4) Accordingly, the front end portion of the leaf spring 1 placed on the right side of the vehicle swings rightward of the vehicle with respect to the vehicle body such that the forces are balanced in the stabled condition.

(5) Meanwhile, with the leaf-spring-side bush 45 of the shackle 4 placed on the left side of the vehicle and acting as the turning-inner-wheel-side to play a role as the rebound side, the split bush 45b, facing the vehicle outside and having low rigidity, is caused to elastically deform in a greater extent than that in which the split bush 45a facing the vehicle inside and having high rigidity, is deformed.

(6) Further, the vehicle-body-side bush 44 is press fitted to the boss portion 10. Consequently, with the vehicle-body-side bush 44 of the shackle 4 placed on the right side of the vehicle, the split bush 44a, facing the vehicle inside and having low rigidity, is caused to elastically deform in a greater extent than that in which the split bush 44b, facing the vehicle outside and having high rigidity, is deformed.

(7) Accordingly, the front end portion of the leaf spring 2 placed on the vehicle at the right side thereof swings rightward of the vehicle with respect to the vehicle body such that the forces are balanced in the stabled condition.

(8) With the second embodiment, as set forth above, when the vehicle is steered in a right direction, none of the rear ends of the leaf springs 1, 2 move and only the front end portions of the leaf springs 1,2 swing rightward of the vehicle with respect to the vehicle body. Then, the rear tires and the leaf springs 1, 2 tilt rightward of the vehicle as viewed from the above.

Thus, when the vehicle is steered rightward, the axle case 8 is caused to rotate in a turning direction about the centers of the antivibrating bodies 5, 6 placed on the leaf springs 1, 2 at the rear end portion of the vehicle, thereby permitting the both drive wheels to have the toe angle θ varying in the under-steer condition.

Accordingly, the drive wheels can be automatically changed to the under-steer condition during the turning motion of the vehicle, enabling the improvement in running stability of the vehicle during the turning motion of the vehicle.

Further, even with the second embodiment, both the split bushes 34a, 34b (44a, 44b) of the vehicle-body-side bush 34 (44), which are split left and right in two halves, respectively, and both the split bushes 35a, 35b (45a, 45b) of the leaf-spring-side bush 35 (45), which are split left and right in two halves, respectively, may suffice to merely have different rigidities. In addition, the second embodiment may employ the same other component parts as those of the related art intact. This results in capability of remarkably reducing production cost.

Third Embodiment

Figure 7A:
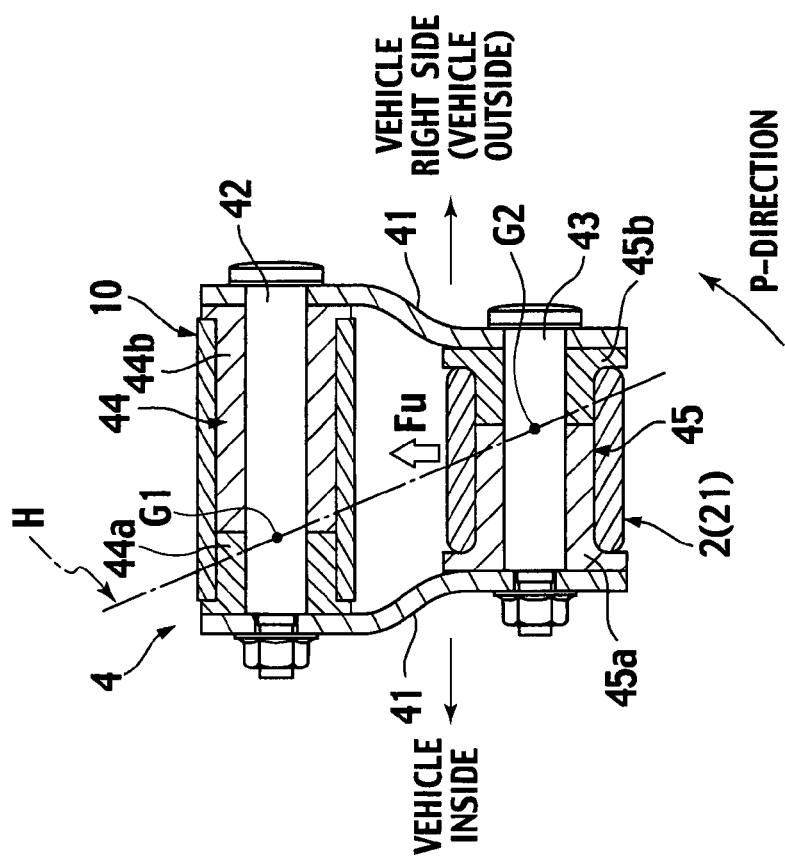
FIGS. 7A and 7B are enlarged cross sectional views showing shackles for suspension leaf springs of a third embodiment as viewed from the vehicle rear side toward the vehicle front side, with FIG. 7A showing a vehicle-left-side shackle and FIG. 7B showing a vehicle-right-side shackle.
Figure 7B:
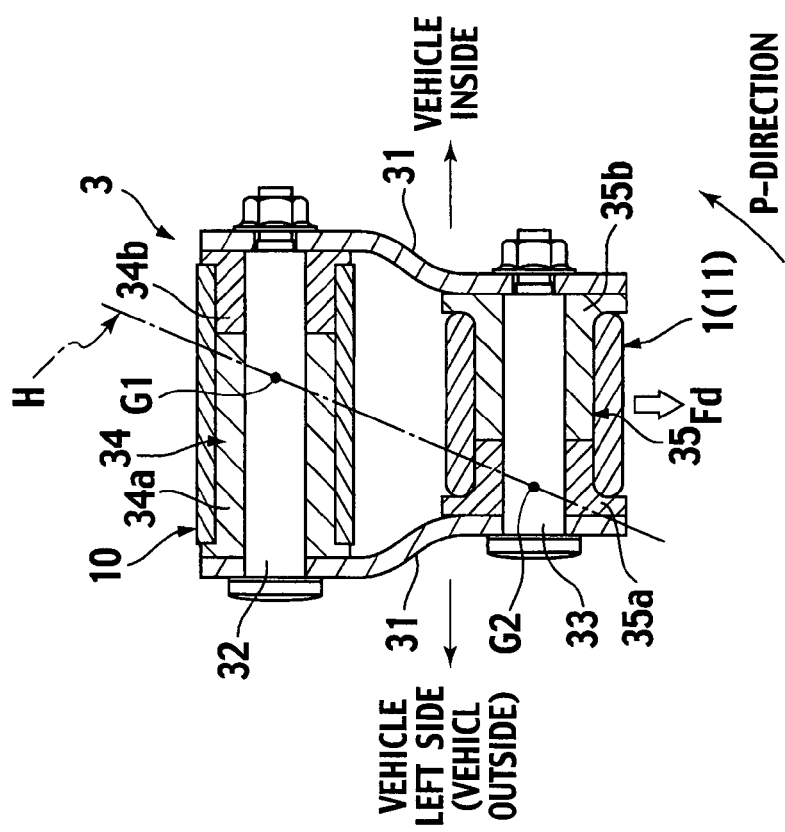

A suspension leaf spring shackle structure of a third embodiment is shown in FIGS. 7A and 7B.

With shackles of the third embodiment, left and right split bushes are structured to have rigidities and lengths different from each other.

More particularly, as shown in FIGS. 7A and 7B, the vehicle-body-side bush 34 of the shackle 3, placed on the vehicle at the left side thereof, includes the split bushes 34a, 34b which are split left and right. The split bush 34b facing the vehicle inside is set to have higher rigidity (that is, high elastic coefficient) than that of the split bush 34a facing the vehicle outside. In addition, the split bush 34a is set to have a longer length than that of the split bush 34b.

Further, the leaf-spring-side bush 35 includes the split bushes 35a, 35b that are split left and right in two halves. Of these, the split bush 35a, facing the vehicle outside, is set to have higher rigidity (that is, high elastic coefficient) than that of the split bush 35b facing the vehicle inside. Moreover, the split bush 35b is set to have a longer length than that of the split bush 35a, facing the vehicle outside.

Furthermore, the vehicle-body-side bush (or bushing) 44 of the shackle 4, placed on the right side of the vehicle, includes the split bushes (or bushings) 44a, 44b that are split left and right. The split bush (or bushing) 44a, facing the vehicle inside is set to have higher rigidity (that is, high elastic coefficient) than that of the split bush (or bushing) 44b facing the vehicle outside. In addition, the split bush (or bushing)

44$b$ is set to have a longer length than that of the split bush (or bushing) 44$a$, facing the vehicle inside.

Moreover, the leaf-spring-side bush (or bushing) 45 includes the split bushes (or bushings) 45$a$, 45$b$ that are split left and right in two halves. Of these, the split bush (or bushing) 45$b$, facing the vehicle outside, is set to have higher rigidity (that is, high elastic coefficient) than that of the split bush (or bushing) 45$a$ facing the vehicle inside. Moreover, the split bush (or bushing) 45$a$ is set to have a longer length than that of the split bush (or bushing) 45$b$, facing the vehicle outside.

With the shackles of the present embodiment, the inclined angle of the rigidity center axes (on the linear line interconnecting the rigidity center positions G1 and G2) H, H is greater than that of the first embodiment shown in FIGS. 2A and 2B. Accordingly, the vehicle has a further increased running stability during the turning motion of the vehicle.

Further, with the present embodiment, no need arises for individual molding dies to be prepared even in the presence of the left and right split bushes in different lengths. This is because of both the left and right split bushes, only a molding die for molding a long split bush suffices to be prepared for fabricating a short split bush with the long split bush being cut in a short length.

Fourth Embodiment

Figure 8B:
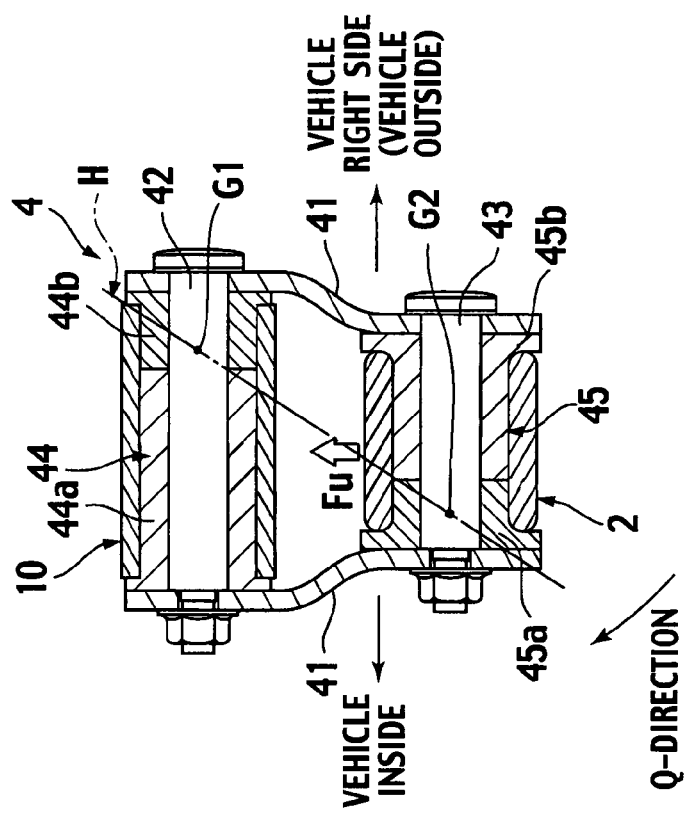
FIGS. 8A and 8B are enlarged cross sectional views showing shackles for suspension leaf springs of a fourth embodiment, with FIG. 8A showing a vehicle-left-side shackle and FIG. 8B showing a vehicle-right-side shackle.
Figure 8A:
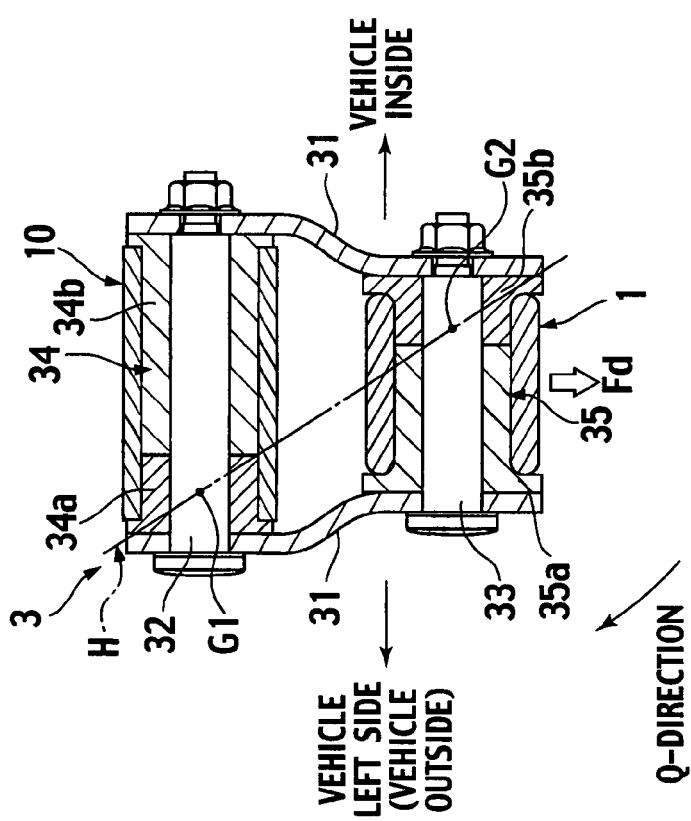

A suspension leaf spring shackle structure of a fourth embodiment is shown in FIGS. 8A and 8B.

With the shackle structure of the fourth embodiment, the left and right split bushes are modified to have rigidities and lengths different from each other. As shown in FIG. 8A, more particularly, the vehicle-body-side bush 34 of the shackle 3, placed on the left side of the vehicle, includes split bushes 34$a$, 34$b$, which are split left and right. The split bush 34$a$ facing the vehicle outside and is set to have higher rigidity (that is, high elastic coefficient) than that of the split bush 34$b$ facing the vehicle inside. In addition, the split bush 34$b$ is set to be longer length than the split bush 34$a$.

Further, the leaf-spring-side bush 35 includes split bushes 35$a$, 35$b$, which are split left and right in two halves. The split bush 35$b$, facing the vehicle inside, is set to be higher rigidity (that is, high elastic coefficient) than the split bush 35$a$ facing the vehicle outside. In addition, the split bush 35$a$ is set to be longer length than the split bush 35$b$.

Furthermore, the vehicle-body-side bush 44 of the shackle 4, placed on the right side of the vehicle, includes split bushes 44$a$, 44$b$, which are split left and right in two halves. The split bush 44$b$, facing the vehicle outside, is set to be higher rigidity (that is, high elastic coefficient) than the split bush 44$a$ facing the vehicle inside. Moreover, the split bush 44$a$ is set to be longer length than the split bush 44$b$.

Further, the leaf-spring-side bush 45 includes split bushes 45$a$, 45$b$, which are split left and right in two halve. The split bush 45$a$, facing the vehicle inside, is set to be higher rigidity (that is, high elastic coefficient) than the split bush 45$b$ facing the vehicle outside. In addition, the split bush 45$b$ is set to be longer length than the split bush 45$a$.

With the shackle structure of the present embodiment, the rigidity center axes (on the linear line interconnecting the rigidity center positions G1 and G2) H, H have a further increased tilting angle. Accordingly, during a turning motion of the vehicle, the vehicle has a further improved running stability.

Furthermore, like the third embodiment set forth above, the present embodiment has no need to prepare discrete molding dies even if the left and right split bushes are different in length. This is because it suffices to prepare only a molding die for forming a long one of the left and right bushes while trimming a length of the long split bush so as to match a length of the short split bush.

Fifth Embodiment

A suspension leaf spring shackle structure of a fifth embodiment is shown in FIGS. 9A and 9B.

The fifth embodiment represents a modified form of the first embodiment wherein the left and right leaf springs 1, 2 have the vehicle-rear-side end portions mounted on the vehicle body via the shackles 3, 4 and the vehicle-front-side end portions of the left and right leaf springs 1, 2 are mounted on the vehicle body via the antivibrating bodies 5, 6.

As shown in FIGS. 9A and 9B, the shackle 3, placed on the left side of the vehicle, includes a shackle plate 31, facing the vehicle outside, and a shackle plate 31, facing the vehicle inside, which are formed in differently folded shapes such that the shackle plate 31 has a leaf spring side offset to the vehicle outside with respect to the vehicle body. Moreover, the shackle 4, placed on the right side of the vehicle, includes a shackle plate 41, facing the vehicle outside, and a shackle plate 41, facing the vehicle inside, which are formed in differently folded shapes such that the shackle plate 31 has a leaf spring side offset to the vehicle outside with respect to the vehicle body.

Further, the vehicle-body-side bush 34 includes split bushes 34$a$, 34$b$, split left and right in two halves, which are structured to have the same rigidity. Moreover, the vehicle-body-side bush 44 also includes split bushes 44$a$, 44$b$, split left and right in two halves, which are also structured to have the same rigidity.

In addition, the leaf-spring-side bush 35 (45) also includes split bushes 35$a$, 35$b$ (45$a$, 45$b$), split left and right in two halves, which are structured to have the same rigidity.

Thus, the vehicle widthwise center positions of the leaf-spring-side bushes 35, 45 are offset toward further vehicle outside areas than those of the vehicle-body-side bushes 34, 44. This allows the rigidity center positions G1 of the vehicle-body-side bushes 34, 44 are offset toward further vehicle inside areas than those of the rigidity center positions G2 of both the leaf-spring-side bushes 35, 45.

That is, even with the fifth embodiment, like the first embodiment, the rigidity center positions G2 of both the leaf-spring-side bushes 35, 45 are offset to the outside areas of the vehicle than the rigidity center positions G1 of the vehicle-body-side bushes 34, 44. Thus, the rigidity center axes (on the linear line interconnecting the rigidity center positions G1 and G2) H, H lie in the tilted state formed in the reverse "V-shape" configuration.

Next, description is made with reference to a case where the steering wheel is steered to turn the vehicle leftward.

(1) First, as the vehicle is steered leftward, a rightward centrifugal force acts on the vehicle body. As shown in FIGS. 9A and 9B, therefore, the right side of the vehicle body bears the load Fu directed upward and the left side of the vehicle body bears the load Fd directed downward. Here, the rigidity center positions G2 of both the leaf-spring-side bushes 35, 45 are offset to the outside areas of the vehicle than the rigidity center positions G1 of the vehicle-body-side bushes 34, 44, respectively, and the rigidity center axes (on the linear line interconnecting the rigidity center positions G1 and G2) H, H lie in the tilted state formed in the reverse "V-shape" configuration.

(2) Accordingly, the rear end portion of the leaf spring 2 mounted on the vehicle body at the right side thereof swings rightward of the vehicle with respect to the vehicle body, that is, in the direction as shown by the arrow P in FIG. 9B such that the forces are balanced in the stabled condition. Meanwhile, the rear end portion of the leaf spring 1 mounted on the vehicle body at the left side thereof swings rightward of the vehicle with respect to the vehicle body, that is, in the direction as shown by the arrow P in FIG. 9A such that the forces are balanced in the stabled condition.

(3) With the fifth embodiment, as set forth above, when the vehicle is steered leftward, none of the front end portions of the leaf springs 1, 2 move and only the rear end portions of the leaf springs 1,2 swing in a right direction of the vehicle. That way, the leaf springs 1, 2 and the rear tires are directed leftward of the vehicle as viewed from the above.

Thus, with the fifth embodiment, the drive wheels can automatically vary in the under-steer condition during the turning motion of the vehicle in the same manner as that achieved in the first embodiment. This results in advantageous effect of having a capability of improving running stability of the vehicle during the turning motion of the vehicle.

Sixth Embodiment

A suspension leaf spring shackle structure of a sixth embodiment is shown in FIGS. 10A and 10B.

The sixth embodiment represents a modified form of the second embodiment wherein the left and right leaf springs 1, 2 have the vehicle-front-side end portions mounted on the vehicle body via the shackles 3, 4 and the vehicle-rear-side end portions mounted on the vehicle body via the antivibrating bodies 5, 6.

As shown in FIGS. 10A and 10B, with the shackle 3 placed on the left side of the vehicle, the shackle plate 31, facing the vehicle outside, and the shackle plate 31, facing the vehicle inside, are formed in differently folded shapes such that the shackle plate 31 has a leaf spring side offset to a further vehicle inside area with respect to the vehicle body. Moreover, with the shackle 4 placed on the right side of the vehicle, the shackle plate 41, facing the vehicle outside, and the shackle plate 41, facing the vehicle inside, are formed in differently folded shapes such that the shackle plate 41 has a leaf spring side offset to the further vehicle inside area with respect to the vehicle body.

Further, the vehicle-body-side bush 34 includes the split bushes 34a, 34b, split left and right in two halves, which are structured to have the same rigidity. Moreover, the vehicle-body-side bush 44 includes the split bushes 44a, 44b, split left and right in two halves, which are also structured to have the same rigidity.

In addition, the leaf-spring-side bush 35 (45) also includes the split bushes 35a, 35b (45a, 45b), split left and right in two halves, and the split bushes 35a, 35b (45a, 45b) are also structured to have the same rigidity.

Thus, the vehicle widthwise center positions of the leaf-spring-side bushes 35, 45 are offset to the further vehicle inside areas than those of the vehicle-body-side bushes 34, 44. This allows the rigidity center positions G1 of the vehicle-body-side bushes 34, 44 to be offset toward the vehicle outside areas than those of the rigidity center positions G2 of both the leaf-spring-side bushes 35, 45.

That is, even with the sixth embodiment, like the second embodiment, the rigidity center positions G2 of both the leaf-spring-side bushes 35, 45 are offset to the further inside areas of the vehicle than the rigidity center positions G1 of the vehicle-body-side bushes 34, 44. Thus, the rigidity center axes (on the linear line interconnecting the rigidity center positions G1 and G2) H, H lie in a tilted state formed in the "V-shape" configuration.

Next, description is made with reference to a case where the steering wheel is steered to turn the vehicle leftward.

(1) First, as the vehicle is steered leftward, a rightward centrifugal force acts on the vehicle body. As shown in FIGS. 10A and 10B, therefore, the right side of the vehicle body bears the load Fu directed upward and the left side of the vehicle body bears the load Fd directed downward. Here, the rigidity center positions G2 of both the leaf-spring-side bushes 35, 45 are offset to the inside areas of the vehicle than the rigidity center positions G1 of the vehicle-body-side bushes 34, 44, respectively, and the rigidity center axes (on the linear line interconnecting the rigidity center positions G1 and G2) H, H lie in the tilted state formed in the "V-shape" configuration.

(2) Accordingly, the front end portion of the leaf spring 2 mounted on the vehicle body at the right side thereof swings leftward of the vehicle with respect to the vehicle body, that is, in the direction as shown by the arrow Q in FIG. 10A. Meanwhile, the front end portion of the leaf spring 1 mounted on the vehicle body at the left side thereof swings leftward of the vehicle with respect to the vehicle body, that is, in the direction as shown by the arrow Q in FIG. 10B such that the forces are balanced.

(3) With the sixth embodiment, as set forth above, when the vehicle is steered leftward, the rear end portions of the leaf springs 1, 2 do not move and only the front end portions of the leaf springs 1,2 swing in a leftward direction of the vehicle. That way, the leaf springs 1, 2 and the rear drive wheels are directed leftward of the vehicle as viewed from the above.

Thus, with the sixth embodiment, the drive wheels can automatically vary in the under-steer condition during the turning motion of the vehicle in the same manner as that achieved in the second embodiment. This results in advantageous effect of having a capability of improving running stability of the vehicle during the turning motion of the vehicle.

While the present invention has been described above with reference to the various embodiments set forth above, the present invention is not limited to the embodiments mentioned above and the present invention may include various design changes or the like without departing a scope of the present invention.

Figure 11A:
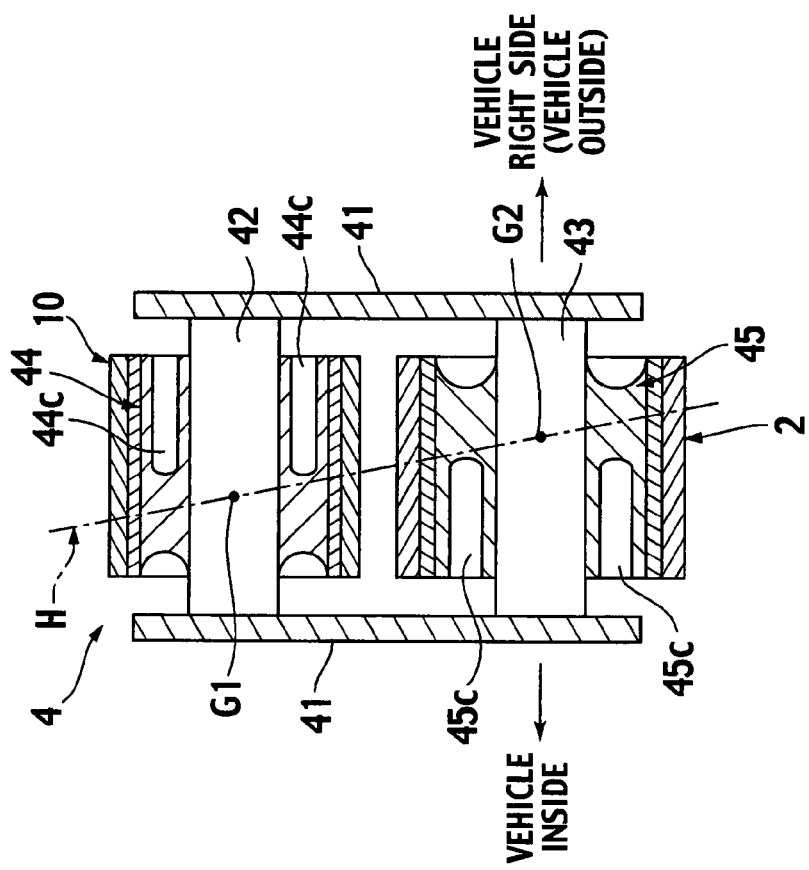
FIGS. 11A and 11B are enlarged cross sectional view showing shackles for suspension leaf springs of the other embodiment
Figure 11B:
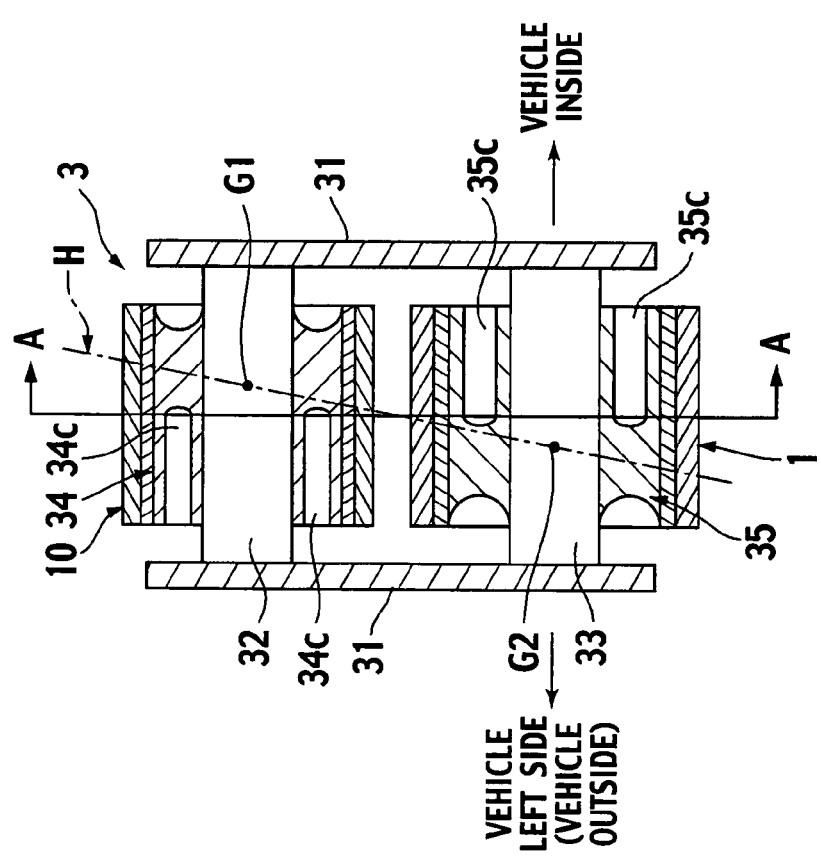

For instance, although with the first and second embodiments, the vehicle-body-side bushes 34, 44 and the leaf-spring-side bushes 35, 45 are split in two halves, respectively, with both the split bushes having rigidities different from each other on left and right sides, the vehicle-body-side bushes 34, 44 and the leaf-spring-side bushes 35, 45 may have one sides formed with cavities 34c, 44c, 35c, 45c, respectively, to provide different rigidities as shown in FIGS. 11A and 11B and FIG. 12.

Further, although with the first and second embodiments, the vehicle-body-side bushes 34, 44 and the leaf-spring-side bushes 35, 45 are split on left and right in two halves, respectively, with both the split bushes having rigidities different from each other on the left and right sides, only either one of the vehicle-body-side bushes 34, 44 and the leaf-spring-side bushes 35, 45 may have rigidities different from each other on the left and right sides.

CROSS REFERENCE TO RELATED APPLICATIONS

This application is based upon and claims the benefit of priority from prior Japanese Patent Application No. P2006-134635, filed on May 15, 2006, and No. P2007-110398, filed on Apr. 19, 2007; the entire contents of which are incorporated herein by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A shackle structure for supporting vehicle-rear-side end portions of a pair of left and right suspension leaf springs on a vehicle body via shackles, comprising:
    shackles including vehicle-body-side bushings supported on the vehicle body, and leaf-spring-side bushings supported on the leaf springs;
    wherein the vehicle-body-side bushings have rigidity center positions that are offset to further inside areas of a vehicle than rigidity center positions of the leaf-spring-side bushings,
    wherein at least one of the vehicle-body-side bushings and the leaf-spring-side bushings are split left and right in two halves;
    wherein both of the split bushings, divided in the two halves, are set to have rigidities different from each other to allow the rigidity center positions of the vehicle-body-side bushings to be offset to the further inside areas of the vehicle than the rigidity center positions of the leaf-spring-side bushings.

2. The shackle structure according to claim 1, wherein the shackles comprise pairs of left and right vehicle-body-side shackle plates, vehicle-body-side bushing support shafts through which upper portions of the shackle plates are connected to each other and leaf-spring-side bushing support shafts through which lower portions of the shackle plates are connected to each other,
    wherein the vehicle-body-side bushings are fitted to the vehicle-body-side bushing support shafts, and
    wherein the leaf-spring-side bushings are fitted to the leaf-spring-side bushing support shafts.

3. A shackle structure for supporting vehicle-rear-side end portions of a pair of left and right suspension leaf springs on a vehicle body via shackles, comprising:
    shackles including vehicle-body-side bushings supported on the vehicle body, and leaf-spring-side bushings supported on the leaf springs;
    wherein the vehicle-body-side bushings have rigidity center positions offset to further inside areas of a vehicle than rigidity center positions of the leaf-spring-side bushings,
    wherein the vehicle-body-side bushings and the leaf-spring-side bushings are split left and right in two halves, respectively;
    wherein for both the split bushings of the vehicle-body-side bushings divided in the two halves, the split bushing facing a vehicle inside has higher rigidity than that of the split bushing facing a vehicle outside, and
    wherein for both the split bushings of the leaf-spring-side bushings divided in the two halves, the split bushing facing the vehicle outside has higher rigidity than that of the split bushing facing the vehicle inside such that the rigidity center positions of both the vehicle-body-side bushings are offset to further inside areas of the vehicle than the rigidity center positions of both the leaf-spring-side bushings.

4. The shackle structure according to claim 3, wherein for both the split bushings of the vehicle-body-side bushings left and right in the two halves, the split bushings facing the vehicle outside have longer lengths than those of the split bushings facing the vehicle inside, and
    wherein for both the split bushings of the leaf-spring-side bushings divided left and right in the two halves, the split bushings facing the vehicle inside have longer lengths than those of the split bushings facing the vehicle outside.

5. A shackle structure for supporting vehicle-front-side end portions of a pair of left and right suspension leaf springs on a vehicle body via shackles, comprising:
    shackles including vehicle-body-side bushings supported on the vehicle body, and leaf-spring-side bushings supported on the leaf springs;
    wherein the vehicle-body-side bushings have rigidity center positions offset to further outside areas of a vehicle than rigidity center positions of the leaf-spring-side bushings,
    wherein at least one of the vehicle-body-side bushings and the leaf-spring-side bushings are split left and right in two halves;
    wherein both the split bushings, divided in the two halves, are set to have rigidities different from each other to allow the rigidity center positions of the vehicle-body-side bushings to be offset to further outside areas of the vehicle than the rigidity center positions of the leaf-spring-side bushings.

6. The shackle structure according to claim 5, wherein the shackles comprise pairs of left and right vehicle-body-side shackle plates, vehicle-body-side bushing support shafts through which upper portions of the shackle plates are connected to each other and leaf-spring-side bushing support shafts through which lower portions of the shackle plates are connected to each other,
    wherein the vehicle-body-side bushings are fitted to the vehicle-body-side bushing support shafts, and
    wherein the leaf-spring-side bushings are fitted to the leaf-spring-side bushing support shafts.

7. A shackle structure for supporting vehicle-front-side end portions of a pair of left and right suspension leaf springs on a vehicle body via shackles, comprising:
    shackles including vehicle-body-side bushings supported on the vehicle body, and leaf-spring-side bushings supported on the leaf springs;
    wherein the vehicle-body-side bushings have rigidity center positions offset to further outside areas of a vehicle than rigidity center positions of the leaf-spring-side bushings,
    wherein the vehicle-body-side bushings and the leaf-spring-side bushings are split left and right in two halves, respectively;
    wherein for both the split bushings of the vehicle-body-side bushings divided in the two halves, the split bushing facing a vehicle outside has higher rigidity than that of the split bushing facing a vehicle inside, and
    wherein for both the split bushings of the leaf-spring-side bushings divided in the two halves, the split bushing facing the vehicle inside has higher rigidity than that of the split bushing facing the vehicle outside such that the rigidity center positions of both the vehicle-body-side bushings are offset to further outside areas of the vehicle than the rigidity center positions of both the leaf-spring-side bushings.

8. The shackle structure for suspension leaf springs according to claim 7, wherein for both the split bushings of the vehicle-body-side bushings divided left and right in the two halves, the split bushings facing the vehicle inside have longer lengths than those of the split bushings facing the vehicle outside, and wherein for both the split bushings of the leaf-spring-side bushings divided left and right in two halves, the split bushings facing the vehicle outside have longer lengths than those of the split bushings facing the vehicle inside.

* * * * *